(12) United States Patent
Buxton

(10) Patent No.: US 7,201,700 B2
(45) Date of Patent: Apr. 10, 2007

(54) GEARED ROTARY ACTUATORS

(75) Inventor: Stephen John Buxton, Coventry (GB)

(73) Assignee: Goodrich Actuation Systems Ltd. (GB)

( * ) Notice: Subject to any disclaimer, the term of this patent is extended or adjusted under 35 U.S.C. 154(b) by 95 days.

(21) Appl. No.: 10/837,733

(22) Filed: May 3, 2004

(65) Prior Publication Data

US 2004/0220014 A1 Nov. 4, 2004

(30) Foreign Application Priority Data

May 3, 2003 (GB) ................................ 0310284.5

(51) Int. Cl.
*F16H 57/08* (2006.01)

(52) U.S. Cl. ..................... 475/341; 475/346

(58) Field of Classification Search ............... 475/338, 475/341, 342, 346, 347, 903, 339, 340; 464/73, 464/160–2

See application file for complete search history.

(56) References Cited

U.S. PATENT DOCUMENTS

| | | | | |
|---|---|---|---|---|
| 2,955,487 A | * | 10/1960 | Malley | ..................... 475/341 |
| 3,008,355 A | * | 11/1961 | Grudin | ..................... 475/334 |
| 3,485,062 A | * | 12/1969 | Blake | ..................... 464/73 |
| 4,583,413 A | * | 4/1986 | Lack | ..................... 74/410 |
| 4,721,016 A | | 1/1988 | Burandt | |
| 4,751,855 A | * | 6/1988 | Hudson | ..................... 475/159 |
| 4,843,912 A | * | 7/1989 | Quick | ..................... 475/334 |
| 4,932,613 A | * | 6/1990 | Tiedeman et al. | ..................... 244/213 |
| 4,979,700 A | | 12/1990 | Tiedeman et al. | |
| 5,120,285 A | * | 6/1992 | Grimm | ..................... 475/342 |
| 6,875,145 B2 | * | 4/2005 | McKay et al. | ..................... 475/5 |

FOREIGN PATENT DOCUMENTS

EP 0 174 829 3/1986

* cited by examiner

*Primary Examiner*—Roger Pang
(74) *Attorney, Agent, or Firm*—Andrus, Sceales, Starke & Sawall, LLP

(57) ABSTRACT

A geared rotary actuator including first and second adjacent, axially aligned actuator slices, each slice having an epicyclic-type reduction gear train including a rotatable input sun gear, a planetary gear assembly driven by the sun gear, and first and second output ring gears driven by the planetary gears, the second output ring gear of each slice being an earth ring gear in use, and the two adjacent earth ring gears being interconnected by axially extending clip means limiting the amount by which said adjacent earth ring gears can be displaced from one another in an axial direction while permitting limited tilting movement of one of the earth ring gears relative to the other to accommodate flexure of the actuator about its longitudinal axis in use.

15 Claims, 4 Drawing Sheets ately the disadvantage of limiting the torque which can be transmitted by way of the sun gears can lead to the need for a longer actuator (having more slices) than would otherwise be required, or to the provision of an actuator of significantly increased overall diameter and weight.

GEARED ROTARY ACTUATORS

TECHNICAL FIELD

This invention relates to Geared Rotary Actuators primarily for use in the positional control of wing-mounted flight control surfaces of an aircraft.

BACKGROUND ART

Typically Geared Rotary Actuators can be used to move leading edge flaps of aircraft wing structures in order to alter the lift characteristics of the wing. Conventionally each actuator includes an epicyclic-type reduction gear train which transmits rotation of an input member to a pair of output members one of which is affixed to the wing structure, and so is usually referred to as an "earth" and the other of which is coupled to the control surface to move the control surface relative to the remainder of the wing structure. Moreover, it is conventional to mount two or more actuators in axial, side-by-side relationship with their input members interconnected so as to rotate in unison, and the earths of adjacent actuator "slices" defined by a single component secured to the wing structure in use, the integral earth structure serving both adjacent actuator "slices." In such an arrangement it is conventional to refer to the whole construction as a geared rotary actuator and to refer to the individual input, gear train, and output assemblies as "slices" of the actuator.

An arrangement of the kind described above is illustrated in our European Patent 0174820. In European Patent 0174820 three actuator slices, 10, 11, and 12 are mounting an axial alignment, and the slices 10 and 11 share a common earth component 17 while the slices 11 and 12 share a similar common earth component connected by a mounting bar 31 to the earth component 17.

European Patent 0174820 discloses an actuator construction which can accommodate limited flexure of the wing of the aircraft in use. A problem arises however where increased flexure of the wing occurs as this can result in jamming or fracture of components of the actuator.

U.S. Pat. No. 4,979,700 discloses an actuator construction in which flexure of the wing structure is accommodated by dividing the earth component bridging two adjacent slices in to two separate components, one for each slice, which can move relative to one another during wing flexure. It is believed that such a construction would accommodate a greater degree of wing flexure than that which can be accommodated by the actuator of European Patent 0174820 but the actuator disclosed in U.S. Pat. No. 4,979,700 has problems attendant upon the division of the earth component into two separate components. The construction disclosed in U.S. Pat. No. 4,979,700 requires the provision of an elongate central shaft extending along the longitudinal axis of the actuator, in order to prevent the slices of the actuator becoming separated before mounting of the actuator to the wing, and to assist in axial location of the slices when the actuator is in use. No significant torque load is transmitted through the shaft during use of the actuator but of course the shaft takes up significant space within the actuator, and contributes to the overall weight of the actuator. Furthermore, the provision of the central shaft necessitates the use of hollow sun gear shafts for each actuator slice thereby contributing to an increased overall diameter of the actuator. Still further, unless a further increase in diameter is to be accommodated the space available for the sun gears is limited and thus the material thickness of the sun gear assemblies is restricted with consequential restriction in the torque which can be transmitted by the sun gear assemblies. Ultimately the disadvantage of limiting the torque which can be transmitted by way of the sun gears can lead to the need for a longer actuator (having more slices) than would otherwise be required, or to the provision of an actuator of significantly increased overall diameter and weight.

It is a primary object of the present invention to provide an actuator in which significant wing flexure can be accommodated without the disadvantages of the construction disclosed in U.S. Pat. No. 4,979,700.

DISCLOSURE OF THE INVENTION

In accordance with the present invention there is provided a geared rotary actuator including first and second adjacent, axially aligned actuator slices, each slice having an epicyclic-type reduction gear train including a rotatable input sun gear, a planetary gear assembly driven by the sun gear, and first and second output ring gears driven by the planetary gears, the second output ring gear of each slice being an earth ring gear in use, and the two adjacent earth ring gears being interconnected by axially extending clip means limiting the amount by which said adjacent earth ring gears can be displaced from one another in an axial direction while permitting limited tilting movement of one of the earth ring gears relative to the other to accommodate flexure of the actuator about its longitudinal axis in use.

Preferably said adjacent earth ring gears each include circumferentially arranged recess means into which protrusions of said clip means extend to link the earth ring gears in an axial direction, the width of said recess means, in an axial direction, being greater than the corresponding thickness dimension of the protrusions of the clip means to permit said tilting movement in use.

Preferably said clip means is disposed internally of said earth ring gears.

Alternatively said clip means is disposed externally of said earth ring gears.

Desirably said clip means comprises a resilient ring having said protrusions extending therefrom and said recess means comprises a circumferentially extending channel in each of said earth ring gears.

Alternatively said clip means comprises a plurality of individual clip elements arranged circumferentially around said earth ring gears and having a support band associated therewith for holding said clip elements in position relative to said earth ring gears.

Conveniently said recess means associated with the protrusions of said clip elements comprises a circumferentially extending channel in each earth ring gear.

Alternatively, said recess means comprises a plurality of individual pockets formed in each earth ring gear and arranged as a circumferentially extending row of pockets, each pocket receiving a protrusion of a respective clip element.

Alternatively said clip means comprises a continuous, relatively rigid ring having a plurality of protrusions disposed resiliently there on, said protrusions being engageable in said recess means of said earth ring gears respectively.

Desirably axial abutment means is disposed within said earth ring gears for abutment by the planetary gear arrangements of the adjacent slices of the actuator, to provide axial location of the planetary gear arrangements within their respective slices.

Conveniently said abutment means is part of said clip means.

Preferably an external sealing member engages the outer surface of the earth ring gears to seal the interface of the two adjacent earth ring gears.

Conveniently one or more internal sealing members is interposed between the inner circumference of each earth ring gear and the associated clip means.

BRIEF DESCRIPTION OF THE DRAWINGS

One example of the present invention is illustrated in the accompanying drawings wherein.

PREFERRED MODE OF CARRYING OUT THE INVENTION

Figure 1:
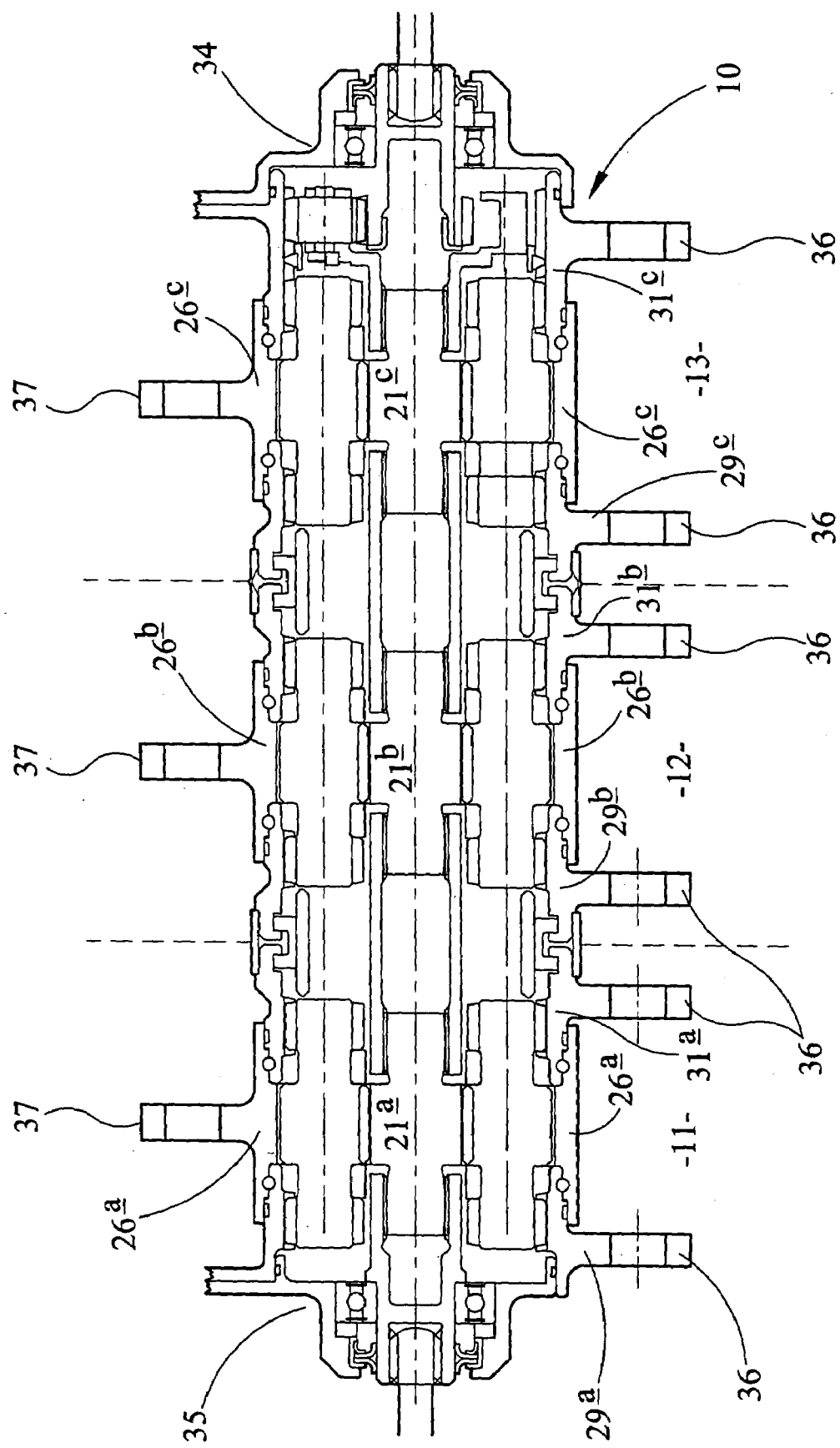
FIG. 1 is a diagrammatic cross-sectional view of a geared rotary actuator.

Referring first to FIG. 1 of the accompanying drawings it can be seen that the actuator 10 comprises three individual actuator slices 11, 12, 13. As is best understood with reference to FIG. 2 each slice includes a drive shaft 21 incorporating an integral sun, input gear 22. In the drawings components having counterparts in other slices carry the same reference numeral, but with the suffix 'a' for slice 11, 'b' for slice 12 and 'c' for slice 13. Disposed coaxially around each sun gear 22 is a planetary gear assembly including a planetary gear carrier 23 rotatably supporting a plurality of planetary gear shafts 24. The planetary gear shafts 24 are equiangularly spaced around the shaft 21 and have their rotational axes parallel to the rotational axis of the shaft 21.

Each shaft 24 has, intermediate its ends, a first integral planetary gear 25, the planetary gears 25 meshing with the sun gear 22. A first output ring gear 26 encircles the planetary gears 25 and meshes therewith. At its opposite axial ends each planetary gear shaft 24 carries respective integral planetary gears 27, 28 which are encircled by respective second output ring gears 29, 31 with which they mesh.

Regions of the first output ring gears 26 coaxially overlie end regions of the second output ring gears 29, 31 and bearings 32 interposed between the ring gears support the ring gears 26 for rotation on the ring gears 29, 31.

Splined sleeve connectors 33 axially interconnect the input shafts 21 so that the three input shafts 21 are driven in unison from a common drive arrangement. Moreover, a similar splined sleeve arrangement 33 interconnects the axially outer end of the shaft 21c with an input drive arrangement 34 the detail of which is not of importance to the present invention. Similarly a splined sleeve arrangement 33 connects the axially outermost end of the shaft 21a with an output drive arrangement 35, the drive arrangements 34 and 35 providing a means whereby the drive to the actuator 10 can be transmitted from an adjacent actuator, and relayed to a further adjacent actuator. The second output ring gears 29, 31 constitute the "earth" of the actuator in use and are provided with outwardly extending lugs 36 whereby the actuator may be anchored to the wing structure of an aircraft. The first output ring gears 26 have similar, radially outwardly extending lugs 37 for connection to the control surface of the aircraft wing which is to be moved relative to the aircraft wing by operation of the actuator.

In use rotational movement transmitted to the actuator 10 through the input assembly 34 rotates each sun gear 22 simultaneously, in the same direction and at the same speed. Each sun gear drives its meshing planet gear 25 and the corresponding planet gears 27, 28 rotate with the planet gear 25. The output ring gears 29, 31 with which the planet gears 27, 28 mesh, are fixed, and so rotation of the gears 27, 28 causes the planetary gear carriers to rotate about the longitudinal axes of the sun gears with the planetary gears 27, 28 precessing around the interior of their respective output ring gears 29, 31. The rotational motion of the planetary gear carriers together with the rotation of the planetary gears 25 causes rotational movement of the first output ring gears 26 about the longitudinal axes of their respective sun gear 22 at a greatly reduced rotational speed, by comparison with the rotational speed of the input, but with significantly enhanced mechanical advantage. The operation of the actuator in this regard will be well understood by the skilled man in the art. It will be recognised therefore that the actuator provides significant force for moving the control surfaces of the wing, but at the same time can provide accurate and fine control over the control surface position relative to the wing.

Figure 2:
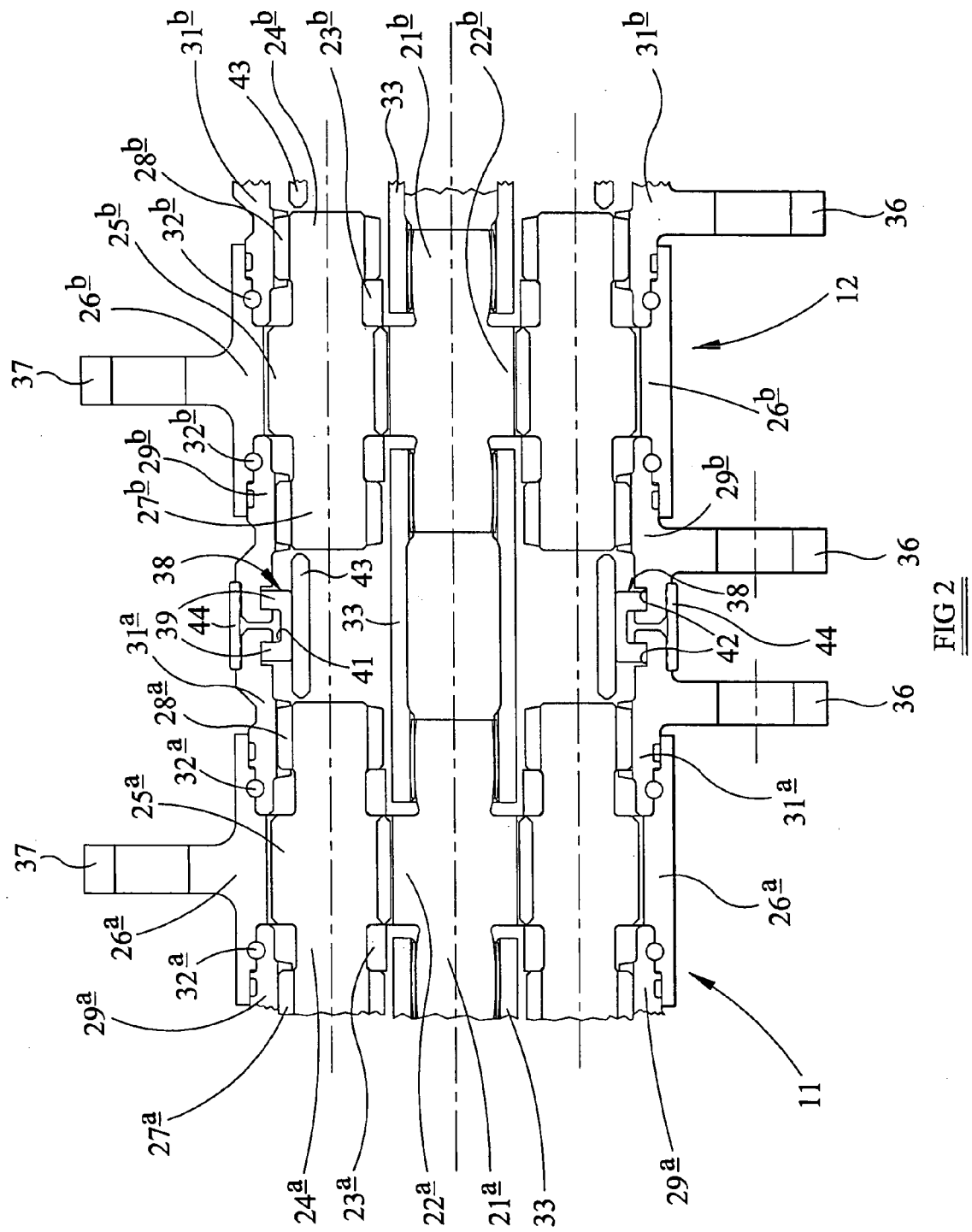
FIG. 2 is an enlargement of part of FIG. 1.

As is apparent, particularly from FIG. 2, the splined end regions of the shafts 21 which are received within the splined sleeves 33 to provide the drive connection between adjacent shafts 21, are of a beveled, or "barrel" form. Thus the interengagement of each shaft 21 with its respective sleeve 33 can accommodate a degree of misalignment of the axes of the shafts 21 and sleeves 33 consequent, for example, on a bending load being applied to the actuator 10 transverse to its longitudinal axis. As the earth ring gears 29, 31 are separate from one another, that is to say are axially discontinuous, each actuator slice 11, 12, 13 can be tilted relative to the adjacent slice to accommodate flexure of the wing structure of the aircraft. However, it will be recognised that during handling of the actuator 10 prior to installation in the aircraft wing structure, and also to a lesser extent after assembly in the wing structure, it is necessary to ensure that relative movement of the earth ring gears 29, 31 axially, in a direction away from one another, is limited so that disengagement, or misalignment, of the internal gears of each slice cannot occur. For this purpose there is provided a clip means linking the earth ring gear 31 of the slice 11 to the ring gear 29 of the slice 12 and a similar clip means linking the ring gear 31 of the slice 12 to the ring gear 29 of the slice 13.

Figure 3:
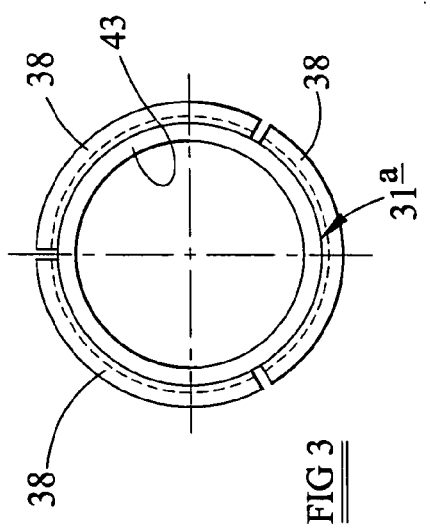
FIG. 3 is a transverse cross-sectional view of part of FIG. 2.

In a first embodiment of an actuator in accordance with the present invention the clip means is as shown in FIGS. 1, 2 and 3 and consists of three 120° segments 38 of a ring of channel-shaped cross-section preferably but not essentially formed from steel. As will be apparent to the skilled man it is not essential that the clip means consists of three segments 38 or that the segments 38 are of equal angular dimension. Moreover it is not essential that the sum of the angular dimensions of the segments is 360°, the segments can be angularly shorter such that there can be circumferential gaps between segment ends.

Reverting to FIGS. 1, 2 and 3, the convex outer surface of each segment 38 has parallel upstanding walls 39 defining between them a recess 41. Internally, the axial end regions of the earth ring gears 31a, 29b and 31b, 29c which project axially beyond the ends of their respective planetary gear shafts 24, are formed with circumferentially extending grooves 42 the side walls of which lie at right angles to the longitudinal axis of the actuator 10, and are spaced apart by a distance greater than the thickness of the upstanding walls 39 of the segments 38 of the clip.

A set of three segments 38 defining a clip is associated with the ring gears 31*a*, 29*b*, and a second identical set of three segments 38 defining a second clip is associated with the ring gears 31*b*, 29*c*. The manner in which the clips are fitted to the ring gears is identical for both pairs of ring gears and so only the fitting in relation to the ring gears 31*a*, 29*b*, as shown to an enlarged scale in FIG. 2, will be described.

During assembly of the actuator the three segments 38 are disposed within the end regions of the ring gears 31*a*, 29*b* such that the upstanding side walls 39 of the clip segments 38 protrude radially outwardly into the channel-shaped grooves 42 of the ring gears 311*a*, 29*b* respectively. The axial length of the clip segments 38 is such that the inner faces of the sidewalls 39 abut the outermost faces of their respective groove 42 when there is a predetermined axial clearance between the mutually presented axial ends of the ring gears 31*a*, 29*b*. The spacing between the ring gears 31*a*, 29*b* (which is clearly shown in FIG. 2) is substantially equal to the spacing between the outer faces of the sidewalls 39 of the segments 38 and the corresponding sidewalls of the channel-shaped grooves 42.

A resilient band 43 of circular cross-section, preferably but not essentially formed from steel, is disposed within the ring defined by the three segments 38. The outer diameter of the band 43 is equal to the inner diameter of the ring defined by the three segments 38 when the radially outer most edges of the side wall 39 of the segments 38 are proximate the base of their respective groove 42. The band 43 thus holds the segments 38 against collapsing radially inwardly, and thus holds the segments 38 in a position such that they bridge, and retain axially the earth ring gears 31*a*, 29*b*. However, it will be recognised that because of the axial clearances between the earth ring gears themselves, and between the earth ring gears and the clip segments 38, the earth ring gears 31*a*, 29*b* can be tilted relative to one another so that their axes are no longer coextensive by an amount sufficient to accommodate significant flexure of the actuator 10 along its length as the corresponding wing structure, to which the actuator 10 is fixed, flexes in flight.

The axial length of each of the bands 43 is greater than the axial length of the ring segments 38 so that the band 43 protrudes axially beyond both axial ends of its respective ring segments 38. The free ends of the band 43 are proximate the axial ends of the planetary gear shafts 24, and so provide an axial abutment for the planetary gear shafts to limit their axial freedom within predetermined regions in their respective actuator slices.

In use the gaps between the earth ring gears 31*a* and 29*b*, and between the earth ring gears 31*b* and 29*c* will be closed by an encircling, resilient band 44 of rubber or like material which grips the outer surfaces of its respective pair of earth ring gears.

Figure 4:
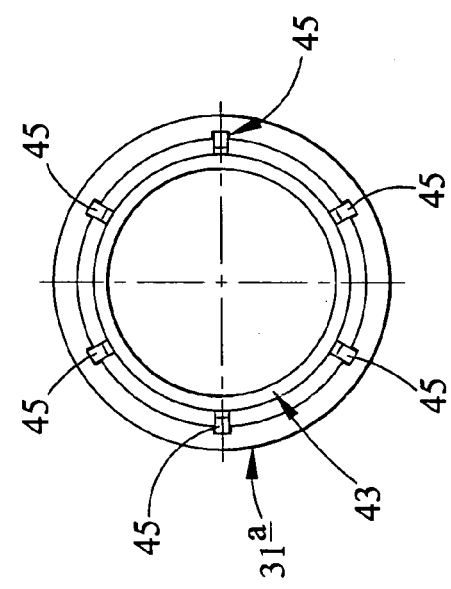
FIG. 4 is a view similar to FIG. 3 illustrating a modification.

In the modification illustrated with reference to FIG. 4 the three segments 38 of the clip described above, which each subtend substantially 120°, are replaced by a plurality of segments 45 (conveniently six segments) each of which is, by comparison with a segment 38, of extremely short circumferential length. However, the cross-sectional shape of each segment 45 is the same as the cross-sectional shape of the segment 38, and a band 43 equivalent to the band 43 of the construction shown in FIG. 3 seats within the segments 45 to hold them in position and to provide an abutment for the planetary gear shafts as described above. In order to prevent the segments 45 moving circumferentially around the earth ring gears 31*a*, 29*b* and 31*b*, 29*c* in use the circumferential channel-shaped grooves 42 of the earth ring gears are replace by similarly shaped, localised pockets in the inner surface of the earth ring gears, the pockets receiving the protruding side walls of the segments 45 as described above in relation to the side walls 39 of the segments 38. Thus the operation of the modification of FIG. 4 is as described above not withstanding the structural differences.

Figure 6:
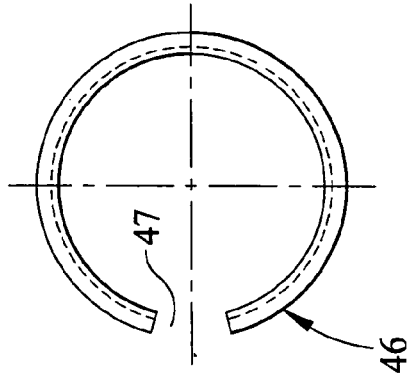
FIG. 6 is a view similar to FIG. 3 of the modification of FIG. 5.
Figure 5:
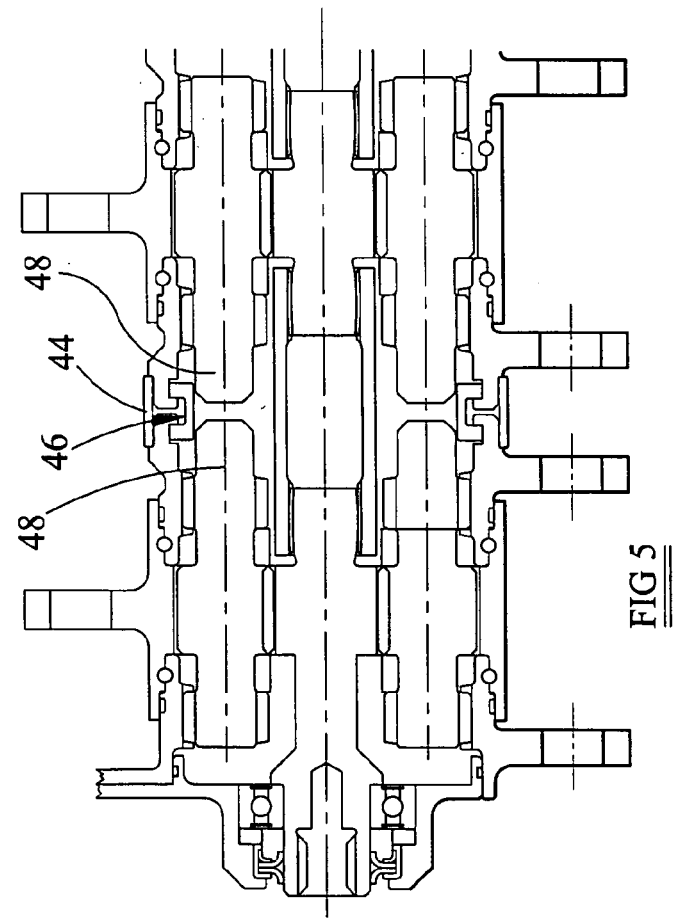
FIG. 5 is a view similar to FIG. 2, to a reduced scale, of a modification.

Turning now to the modification illustrated in FIGS. 5 and 6 the segments 38 or 45 are replaced by a ring component 46 which is substantially a complete ring with the exception of a short circumferential cut-out 47. The cut-out 47 allows the ring 46 to be flexed to reduce its external diameter to facilitate assembly into the actuator. Once assembled the ring component 46 is released so that it restores to its original diameter and its upstanding side walls engage in the circumferential channel-shaped grooves 42 of the earth ring gears exactly as described above with reference to the segments 38. In use therefore the ring component 46 operates, in relation to the earth ring gears, exactly as described above with reference to the segments 38. However, because the ring component 46 is held in place, at its predetermined diameter, by its own inherent resilience the band 43 of the previous embodiment can be dispensed with. As shown in FIG. 5, the planetary gear shafts 24 are extended at 48 so that they terminate proximate one another and provide their own abutments for ensuring that they remain in predetermined axial regions within their respective actuator slices. However it will be understood that instead of or in addition to the shaft extensions 48, a band 43 or its equivalent could be incorporated if desired.

Figure 7:
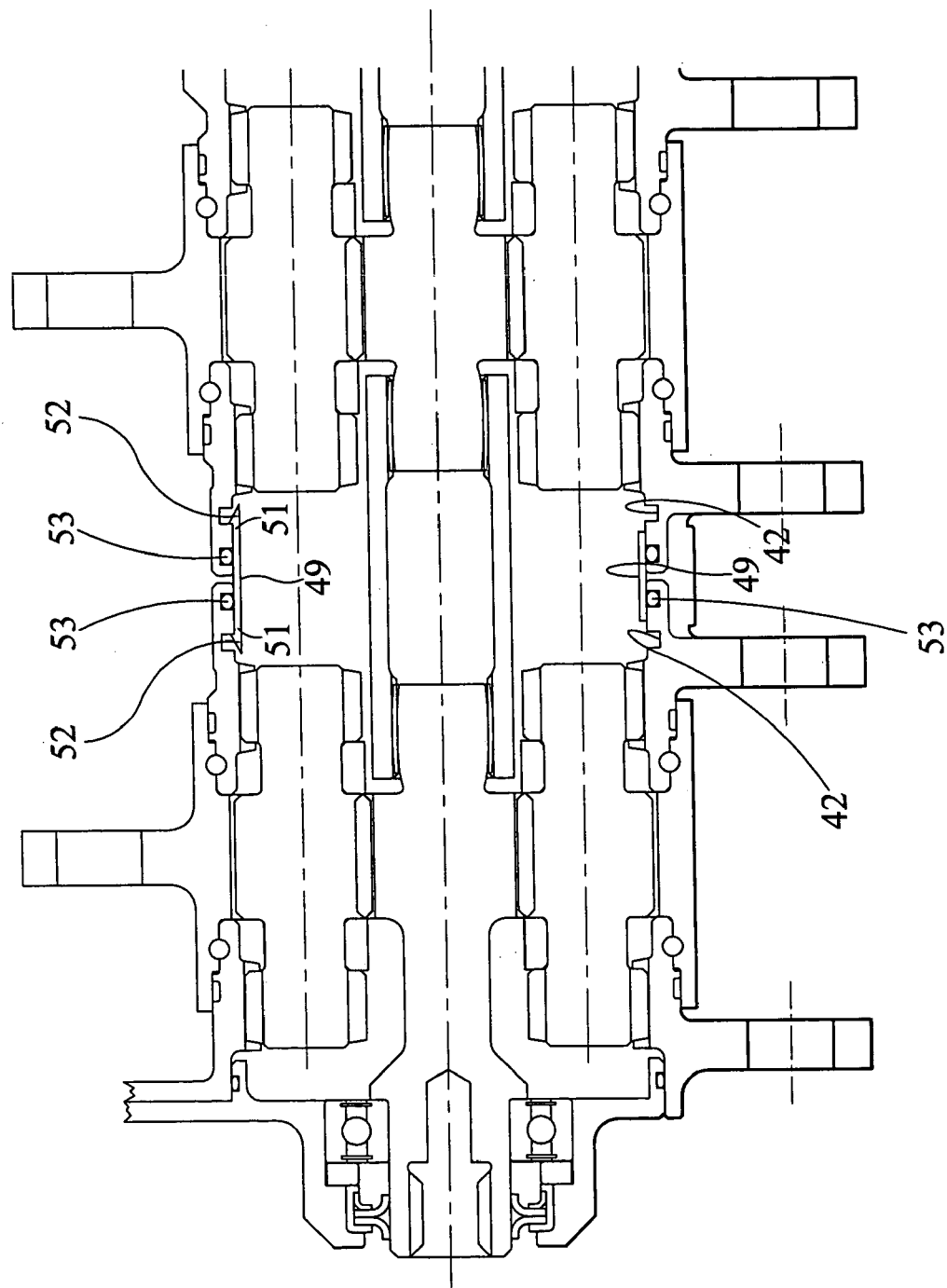
FIG. 7 is a view similar to FIG. 5, but to a slightly enlarged scale, of a further modification.

FIG. 7 shows a still further modification in which the clip means for axially locating the earth ring segments is provided by a cylindrical band 49 the outer diameter of which is substantially equal to the internal diameter of the end regions of the earth ring gears and which has, at opposite axial ends, a circumferentially spaced arrangement of projecting, resilient fingers 51 each of which terminates in a radially outwardly projecting inclined barb 52. The incline barbs 52 present an inclined surface axially so that the fingers 51 will be flexed inwardly by assembling the earth ring gears in an axial direction over the band 49 and each barb has a radially outwardly extending rear surface which engages a corresponding radial surface of a circumferentially extending groove 42, or an appropriately positioned pocket, on the inner wall of the respective earth ring gear. During assembly a band 49 could be offered to the earth ring gear 31*a* and could be moved axially so as to slide within the ring gear 31*a*, the fingers 51 at one axial end of the band 49 flexing inwardly until the barbs 52 align with the groove 42 whereupon the fingers 51 will spring outwardly to engage the radial rear surfaces of the barbs against the corresponding radial face of the groove 42. Thereafter, the ring gear 29*b* will be offered to the opposite end of the band, and will similarly co act with the fingers 51 at the opposite end of the band until the barbs 52 snap into the groove 42 of the ring gear 29*d*. A similar band 49 will be used to interconnect the ring gears 31*b* and 29*c*. It would be recognised that the band 49 can be produced as a single component with the fingers 51 and barbs 52 integral therewith, the components being conveniently formed from spring steel. Again some form of abutment member will need to be incorporated to provide location axially for the planetary gear shafts 24. If desired the planetary gear shafts could be provided with extensions 48 as described in relation to FIG. 5, with or without the provision of a band 43.

Use of a continuous cylindrical band 49 as described with reference to FIG. 7 facilitates the use of "O"-ring seals 53 positioned in circumferential grooves within the earth ring gears and engaging the outer face of the band 49. The use of such seals 53 avoids the necessity for an external sealing band 44 of the kind described above with reference to FIG. 2, it being understood that internally positioned seals 53 are less susceptible to damage in use than is an external sealing band 44. Moreover, a band 44 could be utilized in conjunction with the seals 53 if desired, for example to prevent dirt or other detritus entering the gap between the axial ends of the earth ring gears.

In all of the foregoing embodiments the clip means utilised flexibly to link the adjacent earth ring gears is disposed internally of the actuator, but it is to be recognised that if desired a similar clip arrangement to each of the arrangements described above could be utilised externally, the grooves or pockets of the ring gears being provided in the outer circumferential surface of the ring gears, and the clips being the inverse of the clip components described above in the sense that the protrusions 38 or 52 of the clip components extend radially inwardly with the clip components themselves being disposed about the exterior of the ring gears.

The invention claimed is:

1. A geared rotary actuator including first and second adjacent, axially aligned actuator slices, each slice having an epicyclic-type reduction gear train including a rotatable input sun gear, a planetary gear assembly having planetary gears driven by the sun gear, and first and second output ring gears driven by the planetary gears, the second output ring gear of each slice being an earth ring gear in use, the earth ring gear of the first actuator slice and the earth ring gear of the second actuator slice being adjacent and being interconnected and held together by axially extending clip means limiting the amount by which said adjacent earth ring gears can be displaced from one another in an axial direction while permitting limited tilting movement of one of the earth ring gears relative to the other to accommodate flexure of the actuator about its longitudinal axis in use.

2. An actuator is claimed in claim 1 wherein said adjacent earth ring gears each include circumferentially arranged recess means into which protrusions of said clip means extend to link the earth ring gears in an axial direction, the width of said recess means, in an axial direction, being greater than the corresponding thickness dimension of the protrusions of the clip means to permit said tilting movement in use.

3. An actuator as claimed in claim 1 wherein said clip means is disposed internally of said earth ring gears.

4. An actuator as claimed in claim 1 wherein said clip means comprises a resilient ring having said protrusions extending therefrom and said recess means comprises a circumferentially extending channel in each of said earth ring gears.

5. An actuator as claimed in claim 1 wherein said clip means comprises a plurality of individual clip elements arranged circumferentially around said earth ring gears and having a support band associated therewith for holding said clip elements in position relative to said earth ring gears.

6. An actuator as claimed in claim 1 wherein said recess means associated with the protrusions of said clip elements comprises a circumferentially extending channel in each earth ring gear.

7. An actuator as claimed in claim 1 wherein, said recess means comprises a plurality of individual pockets formed in each earth ring gear and arranged as a circumferentially extending row of pockets, each pocket receiving a protrusion of a respective clip element.

8. An actuator as claimed in claim 1 wherein said clip means comprises a continuous, relatively rigid ring having a plurality of protrusions disposed resiliently there on, said protrusions being engageable in said recess means of said earth ring gears respectively.

9. An actuator as claimed in claim 1 wherein axial abutment means is disposed within said earth ring gears for abutment by the planetary gear assemblies of the adjacent slices of the actuator, to provide axial location of the planetary gear assemblies within their respective slices.

10. An actuator as claimed in claim 9 wherein said abutment means is part of said clip means.

11. An actuator as claimed in claim 1 wherein an external sealing member engages the outer surface of the earth ring gears to seal the interface of the two adjacent earth ring gears.

12. An actuator as claimed in claim 1 wherein one or more internal sealing members is interposed between the inner circumference of each earth ring gear and the associated clip means.

13. A geared rotary actuator including first and second adjacent, axially aligned actuator slices, each slice having an epicyclic-type reduction gear train including a rotatable input sun gear, a planetary gear assembly having planetary gears driven by the sun gear, and first and second output ring gears driven by the planetary gears, the second output ring gear of each slice being an earth ring gear in use, the earth ring gear of the first actuator slice and the earth ring gear of the second actuator slice being adjacent and being interconnected by axially extending clip means limiting the amount by which said adjacent earth ring gears can be displaced from one another in an axial direction while permitting limited tilting movement of one of the earth ring gears relative to the other to accommodate flexure of the actuator about its longitudinal axis in use, wherein said adjacent earth ring gears each include circumferentially arranged recess means into which protrusions of said clip means extend to link the earth ring gears in an axial direction, the width of said recess means, in an axial direction, being greater than the corresponding thickness dimension of the protrusions of the clip means to permit said tilting movement in use.

14. An actuator as claimed in claim 13 wherein said clip means comprises a resilient ring having said protrusions extending therefrom and said recess.

15. An actuator as claimed in claim 13 wherein said recess means associated with the protrusions of said clip elements comprises a circumferentially extending channel in each earth ring gear.

* * * * *